United States Patent [19]

Bronshvatch

[11] Patent Number: 4,845,581

[45] Date of Patent: Jul. 4, 1989

[54] DISC HOUSING CLAMPING METHOD

[75] Inventor: Efim Bronshvatch, Santa Clara, Calif.

[73] Assignee: Seagate Technology, Inc., Scotts Valley, Calif.

[21] Appl. No.: 115,715

[22] Filed: Nov. 2, 1987

[51] Int. Cl.⁴ .......................................... G11B 05/012
[52] U.S. Cl. ............................ 360/98.01; 360/97.01; 360/137
[58] Field of Search ..................... 360/98, 97, 99, 137, 360/98.01, 99.01, 97.01, 137; 174/50, 52.1; 220/4 B

[56] References Cited

U.S. PATENT DOCUMENTS

| | | | |
|---|---|---|---|
| 3,356,245 | 12/1967 | Little | 174/92 |
| 3,980,197 | 9/1976 | Ware | 174/58 |
| 4,185,309 | 1/1980 | Feldstein et al. | 360/97 |
| 4,580,004 | 4/1986 | Beneteau | 174/52.1 |
| 4,636,892 | 1/1987 | Friehauf et al. | 360/97 |
| 4,672,487 | 6/1987 | Brand et al. | 360/97 |
| 4,724,499 | 2/1988 | Bratvold et al. | 360/98 |
| 4,725,904 | 2/1988 | Dalziel | 360/97 |

Primary Examiner—John H. Wolff
Assistant Examiner—Matthew J. Bussan
Attorney, Agent, or Firm—Flehr, Hohbach, Test Albritton & Herbert

[57] ABSTRACT

A disc drive is disclosed which includes a base casting, a spindle motor mounted for supporting one or more discs for continuous rotation, an actuator for selectively positioning the transducers relative to the disc, and a cover which is to be fastened to the base casting to provide a sealed head disc environment. In order to achieve the seal in a preferred form of the invention, several corners of the base casting and/or other points along the edges of the casting are cast with upright posts. In assembly of the drive, a seal is placed around the upstanding edge of the casting, with the post protruding through the seal. The cover, which has openings matching the posts, is pressed down against the seal with the post protruding up through the cover and seal or gasket. An attachment clip is then pressed down over the top of the post, the clip being defined to comprise an annular ring and a plurality of inwardly protruding fingers, the fingers being sufficiently long that their ends slide against and the fingers are flexed by friction between the post and the ends of the fingers. Therefore, when the attachment clip is pressed down in place against the cover, the clip cannot ride back up over the post so that the cover is held tightly down against the gasket and base casting.

1 Claim, 2 Drawing Sheets

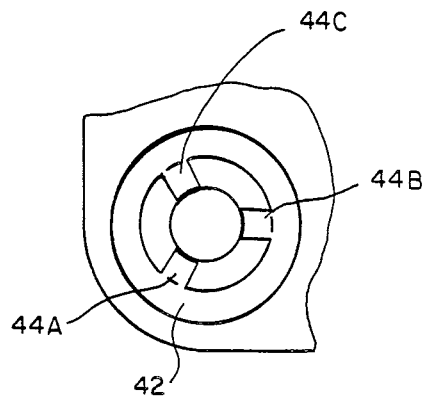
FIG.—4
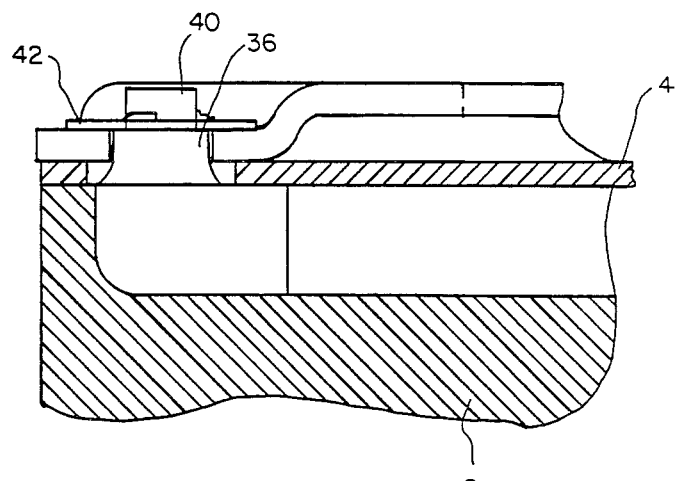
FIG.—3

DISC HOUSING CLAMPING METHOD

CROSS REFERENCE TO RELATED APPLICATION

This invention is useful in disc drives of the type disclosed in U.S. Application Ser. No. 914,690, filed Oct. 2, 1986 and in Application Ser. No. 116,044, in the name of McLeod and Peterson entitled "MAGNETIC RETURN PATH" filed simultaneously herewith and assigned to the Assignee of this invention. Both applications are incorporated herein by reference.

FIELD OF THE INVENTION

This invention is directed generally to the field of disc drives and more particularly to improved means for clamping two mechanical elements together in a disc drive without the use of screws.

BACKGROUND OF THE INVENTION

In many data storage applications, there is a requirement for a disc drive having a high storage capacity within a small physical envelope. To satisfy this, Winchester type disc drives have come into common use. Such drives enclose one or more hard discs in a sealed enclosure designed in accordance with the above incorporated '690 patent application.

In such disc drives, where high storage capacity is contained within a limited space, it is important to provide a system in which the discs and read/write head assemblies remain precisely aligned, so that the data can be reliably accessed. With a need for increasing capacity, the circular tracks on the rotating disc on which data is stored are being moved closer and closer together. Thus it is essential that any sources of stress which might affect the precise alignment of the mechanical elements in th mechanical system must be eliminated.

It is a further problem occasioned by the close packing of adjacent data recording tracks, that any sources of contamination within the head disc assembly (HDA) must be eliminated. In the past, a common source of contamination has been the fact that screws are used to fasten the disc drive cover and base assembly together. When the screws were removed, or moved in their screw holes for another reason, they became a source of particulate matter within the HDA.

A further problem imposed by the use of screws in assembling the cover and base plate, was the fact that the tight fit created between these two pieces created stress in the base plate as the operating temperature of the base plate changed. Because of the position of disc drives within the computer, the base plate of a disc drive which supports both the spindle motor for rotating the disc and the actuator arm which carries the transducer for accessing the disc is subjected to significant thermal stress. In the absence of a way to relieve such stress, some relative movement of the actuator and spindle could occur, resulting in a misalignment of the transducer relative to the disc.

Finally, with the current move to 3½" disc drives, and the many entrants in the field, cost has become a significant factor in the purchasing decision. The use of screws to bolt the top and bottom pieces of the HDA together represents a significant cost factor in the assembling process. It requires the use of a large number of parts, and is a function which is not easily automated. Therefore the problem to be addressed is to reliably clamp the pieces of the HDA together, while minimizing costs and avoiding the introduction of thermal or mechanical stresses which could result in misalignment of the mechanical elements of the system.

SUMMARY OF THE INVENTION

It is an objective of this invention to provide an improved clamping means for clamping the top cover and base casting of a disc drive together.

More particularly, it is an objective of this invention to provide a clamping device for use in disc drive assembly which is inexpensive and the use of which is easily automated.

Another objective of this invention is to provide a clamping means for clamping together elements of a disc drive which can be relatively easily removed for rework of the disc drive.

A further objective of the invention is to provide a clamping means for assembling a disc drive wherein no holes need to be introduced into the HDA such as used for screws or the like to minimize contamination within the HDA.

A further objective of this invention is to provide a clamping means for the disc drive that holds the mechanical assembly tightly together but without the introduction of thermal or mechanical stresses which could result in misalignment of the actuator assembly.

These and other objectives of the present invention are achieved in a disc drive which includes a base casting, means for mounting a spindle motor for supporting one or more discs for continuous rotation, means for supporting an actuator and for selectively positioning the actuator and the transducers and supports relative to the disc, and a cover which is to be fastened to the base casting to provide a sealed head disc environment. In order to achieve the seal in a preferred form of the invention several corners of the base casting and/or other points along the edges of the casting are cast with upright posts. In assembly of the drive, a seal is placed around the upstanding edge of the casting, with the post protruding through the seal. The cover, which has openings matching the posts, is pressed down against the seal with the post protruding up through the cover and seal or gasket. An attachment clip is then pressed down over the top of the post, the clip being defined to comprise an annular ring and a plurality of inwardly protruding fingers, the fingers being sufficiently long that their ends slide against and the fingers are flexed by friction between the post and the ends of the fingers. Therefore, when the attachment clip is pressed down in place against the cover, the clip cannot ride back up over the post so that the cover is held tightly down against the gasket and base casting.

Other features and advantages of the present invention will become apparent from a review of the following drawings.

BRIEF DESCRIPTION OF THE DRAWINGS

FIG. 3 is an elevational sectional view of the assembly of the base casting and cover using the attachment of the invention; and FIG. 4 is a plan view of a preferred embodiment of the clip which is used to assemble the elements of the disc drive in the present invention.

DETAILED DESCRIPTION OF A PREFERRED EMBODIMENT

Figure 1:
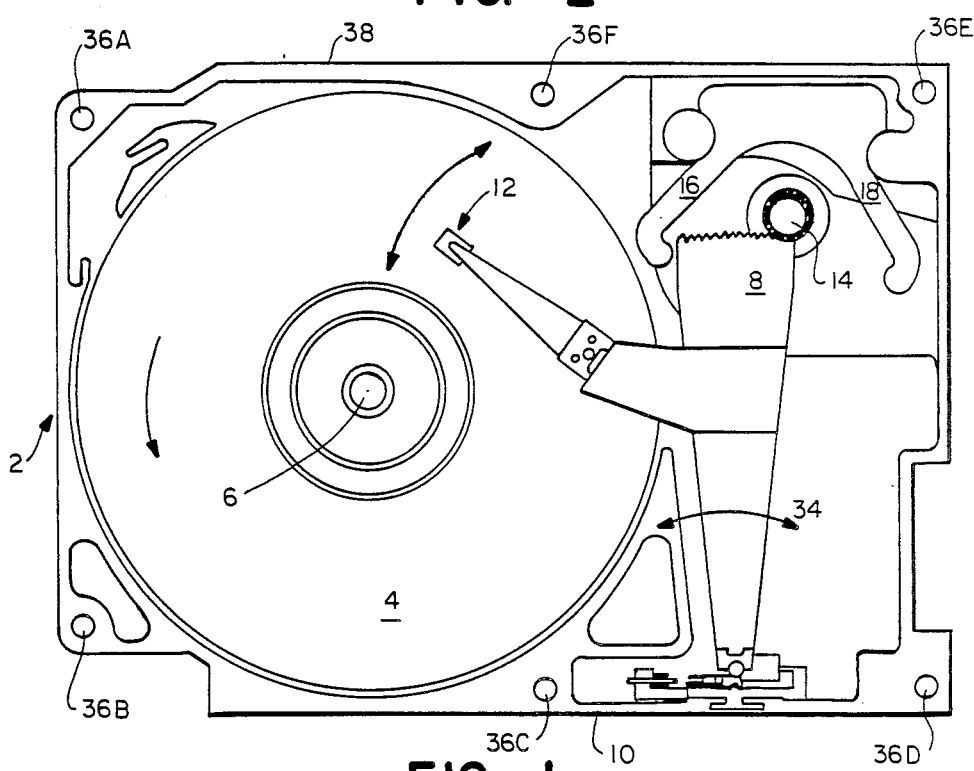
FIG. 1 is a plan view of a base casting of a disc drive with which this invention is useful.

FIG. 1 is a plan view of the base casting and the major elements of a disc drive with which the present invention is particularly useful. More particularly, this figure shows a disc drive including one or more discs mounted for rotation on spindle 6. An actuator arm 8 is provided supported from the upright sidewall 10. Movement of the actuator arm and the transducer heads 12 which hit supports relative to the disc 4 is caused by a stepper motor 14. Arms 16, 18 function as a crash stop. Further details of this invention may be found in U.S. application ser. No. 115,536, filed Oct. 30, 1987 entitled DISC DRIVE INCORPORATING AUTOMATIC COMPENSATION FOR A PIVOTED ARM, by Wilkinson and incorporated herein by reference.

Figure 2:
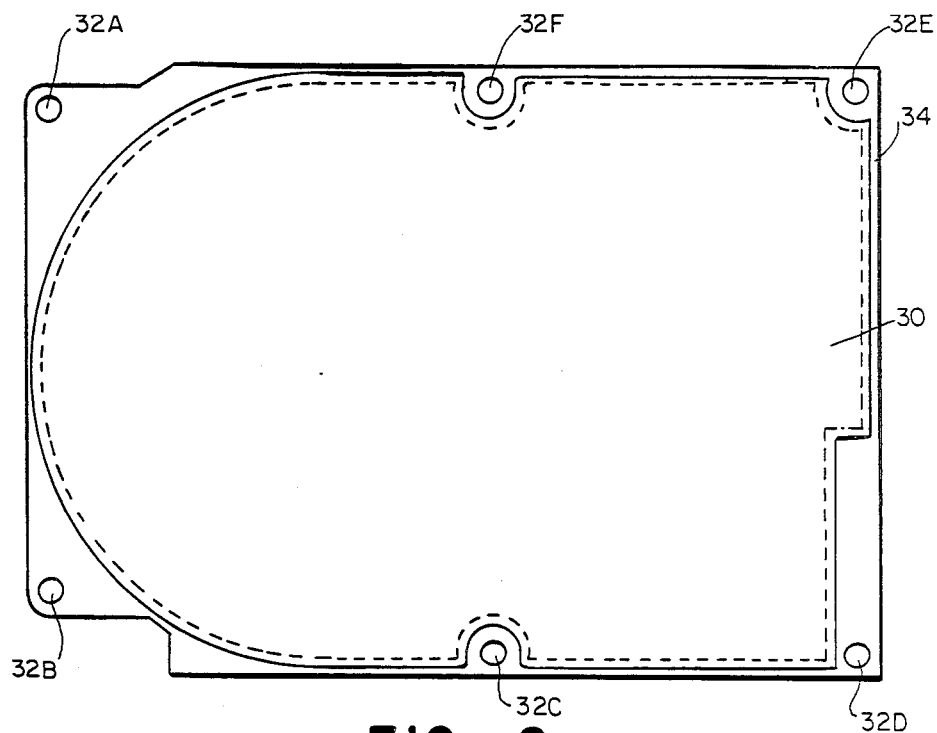
FIG. 2 is a plan view of the cover of the disc drive which is to be assembled with the base casting of FIG. 1.

The cover plate in FIG. 2 is adapted to fit over and tightly mate with the base casting of the present invention. The cover plate 30 includes a plurality of holes 32A-F. These holes are provided at spaced distances around the periphery 34 of the cover 30 to easily mate with upright posts which are provided in the peripheral wall 38 of the base casting 2. It is immediately apparent from inspection of FIGS. 1 and 2 that the cover plate 30 can be placed over and be tightly fitted against the base casting 2 with the posts 36A-F protruding up through the opening 32A through F as is shown more clearly in the sectional view of FIG. 3.

FIG. 3 shows in vertical section a corner of the base casting 2 and a related corner of the cover 30. In order to provide the required tight HDA environment, a seal or gasket 40 is put in place overlying the peripheral wall 38 of the base casting before the cover is put in place. The cover 30 is then pressed down tightly against this gasket and the base casting so that the post may protrude up through the cover. It can also be seen from inspection of FIG. 3 that the top portion 40 of the post 36 which protrudes up through the cover may be of reduced diameter to precisely locate the attachment clip 42 which is to be fitted over the post.

Referring to FIG. 4 which shows the attachment clip 42, it can be seen that it has a generally annular design and includes a plurality of fingers 44A-C. Preferably, these fingers are regularly spaced, and the entire clip is formed of a material which while strong, does allow these fingers to flex. The fingers extend in far enough that when the clip is pressed down over the post 40, there will be frictional engagement between the ends of the fingers 44B and the upper portion 40 of the post 36. Thus, as can clearly be seen in the sectional view of FIG. 3, the fingers 44 are distorted out of their original plane which they lie in when the clip has not been used, and extend slightly upward against the sides of the post 40. As a result, though there may be some upward pressure caused by the tight fit between the base 2, seal 40 and cover 30, the force is not sufficient to push the clip 42 up over the post 40 so that the cover remains tightly in place. Because of this assembly process, even with radical thermal cycling of the disc drive assembly, no stress is introduced into the base plate 2 because of the sliding fit of the clip onto the post which does allow for some minimal flexing of the base relative to the cover and therefore eliminates the possibility of thermal distortion of the base which could otherwise distort the base plate. It can also be seen that this method of assembly is very inexpensive, is easily automated, and that the clip with the proper tool can be easily removed for rework of the disc drive. Because no holes are introduced in the HDA, since all of the assembly work is done external to the HDA, the possibility of contamination of the HDA even when screws are removed due to the introduction of particulate matter into the disc drive is now eliminated.

It should be noted that this same assembly method while preferred for assembly of the base casting and cover, may be used to assemble other portions of the disc drive. For example, the printed circuit board which is mounted on the rear surface of the base casting could also be mounted in place using this same method. The front panel which must be applied to the front of the disc drive and typically required holes to be drilled through the front panel can also be mounted using this assembly technique.

Other modifications of the present invention may become apparent to a person of skill in the art who studies the present invention disclosure. Therefore, the scope of the present invention is to be limited only by the following claims.

What is claimed is:

1. A base casting, means for mounting a spindle motor for supporting one or more discs for continuous rotation, means for supporting an actuator and for selectively positioning the actuator, transducers and supports relative to the disc, a cover which is to be fastened to the base casting to provide a sealed head disc environment, wherein several corners of the base casting are cast with upright posts, a seal being placed around the upstanding edge of the casting, the casting posts protruding through the seal, the cover, which has openings matching the posts, being pressed down against the seal with the posts protruding up through the cover and seal, and an attachment clip pressed down over the top of the post, the clip being defined to comprise an annular ring and a plurality of inwardly protruding fingers, the fingers being sufficiently long that their ends slide against and the fingers are flexed by friction between the post and the ends of the fingers, whereby when the attachment clip is pressed down in place against the cover, the clip cannot ride back up over the post so that the cover is held tightly down against the seal and base casting.

* * * * *